United States Patent [19]

Elamin

[11] Patent Number: 5,145,495
[45] Date of Patent: Sep. 8, 1992

[54] AIR DRYER PURGE CYCLE TIMING CONTROL

[75] Inventor: Naman A. Elamin, Avon, Ohio

[73] Assignee: Allied-Signal Inc., Morristown, N.J.

[21] Appl. No.: 715,062

[22] Filed: Jun. 13, 1991

[51] Int. Cl.$^5$ .............................................. B01D 53/02
[52] U.S. Cl. ........................................ 55/162; 55/387; 55/271
[58] Field of Search ............... 55/302, 316, 271, 387, 55/213, 162, 163

[56] References Cited

U.S. PATENT DOCUMENTS

| | | | |
|---|---|---|---|
| 3,696,588 | 10/1972 | Dussourd et al. | 55/163 |
| 4,685,941 | 8/1987 | Sato | 55/163 |
| 4,806,134 | 2/1989 | Lhota | 55/163 |
| 4,812,148 | 3/1989 | Hata et al. | 55/162 |
| 4,892,569 | 1/1990 | Kojima | 55/163 |

FOREIGN PATENT DOCUMENTS

| | | |
|---|---|---|
| 3210030 | 9/1983 | Fed. Rep. of Germany . |
| 3514473 | 10/1986 | Fed. Rep. of Germany . |
| 60-25527 | 2/1985 | Japan . |
| 62-125826 | 6/1987 | Japan . |
| 63-28426 | 2/1988 | Japan . |
| 63-194717 | 8/1988 | Japan . |

Primary Examiner—Bernard Nozick
Attorney, Agent, or Firm—Ken C. Decker; William N. Antonis

[57] ABSTRACT

A compressed air system for an automotive vehicle includes an air compressor which generates compressed air which is dried by an air dryer and stored in an air storage reservoir. The air dryer is regenerated by using compressed air stored in the storage reservoir instead of compressed air stored in a purge volume within the air dryer. A timer actuated solenoid operated valve controls the length of the purge cycle.

15 Claims, 1 Drawing Sheet

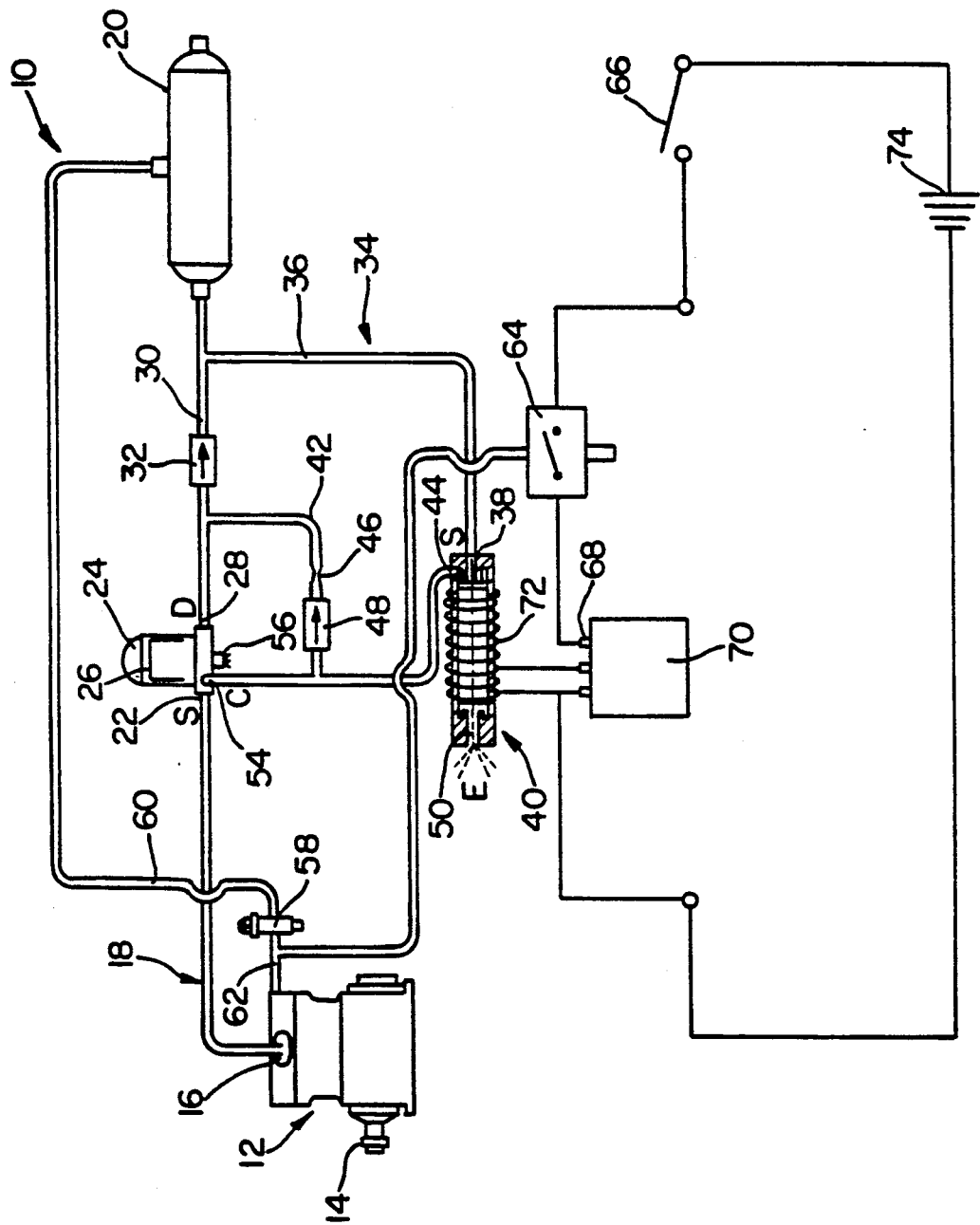

AIR DRYER PURGE CYCLE TIMING CONTROL

This invention relates to a purge or regeneration control for an air dryer used in a compressed air system, such as a compressed air braking system on a heavy-duty vehicle.

It has become increasing common to provide an air dryer to remove entrained moisture from the compressed air generated by a vehicle air compressor which is used to actuate the brakes of the vehicle and other air actuated appliances. By removing the entrained moisture, many problems are avoided, such as freeze-up of components during cold weather. Typical air dryers use a bed of desiccant material which removes moisture from compressed air before the compressed air reaches the storage reservoirs.

The air dryer includes a desiccant bed which must be periodically regenerated or purged of its moisture content. This regeneration is effected when the air compressor is unloaded or disabled. Automotive air compressors are equipped with a governing device which is responsive to the pressure level in the storage reservoirs to disable the compressor when the pressure level in the storage reservoirs has attained a preset limit. These governors generate a pressure signal when the compressor is to be disabled, and such disabling is normally effected by holding the valves of the compressor open to unload the compressor. Unloading of the air compressor may also be effected by actuating a pressure responsive clutch to disconnect the air compressor from being driven by the vehicle engine.

When the desiccant bed is purged and regenerated, a relatively small quantity of air which is kept segregated within the air dryer in a so-called purge volume is caused to flow through the desiccant to remove moisture from the desiccant. The purge air is then exhausted to atmosphere. However, use of a purge volume to segregate the air to be used for regeneration substantially increases the size and weight of the air dryer, causing packaging and other installation difficulties when the air dryer is installed on a vehicle. Furthermore, servicing of the air dryer is made relatively difficult, since the desiccant bed is usually placed within the purged volume. When the desiccant is spent and must be replaced, the entire air dryer must be disassembled in order to replace the desiccant.

The present invention eliminates the purge volume from the air dryer by using a small portion of the compressed air stored in the common vehicle storage reservoirs for purging. Purging is limited to a predetermined time period, so that the integrity of the air stored within the reservoir is not unduly compromised. Accordingly, the air dryer design is simplified, so that easily replaceable desiccant canisters are possible. Furthermore, the size and weight of the air dryer is substantially reduced, thereby simplifying installation and maintenance on the vehicle, and reducing manufacturing costs.

These and other advantages of the present invention will become apparent from the following description, with reference to the accompanying drawing, the sole Figure of which is a diagrammatic illustration of a compressed air system made pursuant to the teachings of the present invention.

Referring now to the drawing, a compressed air system generally indicated by the numeral 10 is mounted on an automotive vehicle (not shown) for generating compressed air for actuation of the vehicle brakes and other compressed air operated appliances. The system 10 includes a conventional air compressor 12 which is powered by the vehicle engine through crankshaft 14 of the compressor 12. Compressed air generated by the compressor 12 is communicated through outlet or delivery port 16 of air compressor 12 into a conduit system generally indicated by the numeral 18 for delivery to a storage reservoir generally indicated by the numeral 20. Conduit system 18 connects the outlet delivery port 16 with supply port 22 of air dryer 24. Air dryer 24 may be of the same general type disclosed in U.S. Pat. No. 4,487,617, except that the housing of the air dryer has been redesigned to eliminate the purge volume surrounding the desiccant bed. Air dryer 24 includes a desiccant bed 26 included within the air dryer. Compressed air communicated through supply port 22 flows through the desiccant bed 26 and out of the delivery port 28 of the air dryer 24 and into a branch 30 of the conduit system 18, which communicates air received from delivery port 28 into the air storage reservoir 20. A one-way check valve 32 is included within branch 30 and permits flow of compressed air from delivery port 18 into the air storage reservoir 20, but prevents communication in the reverse direction.

Conduit system 18 further includes another branch generally indicated by the numeral 34 which is connected from the air storage reservoir 20 to the delivery port 28 around the check valve 32. Second branch 34 includes a first section 36, which communicates the air storage reservoir 20 with a supply or inlet port 38 of an electrically actuated solenoid control valve of conventional design generally indicated by the numeral 40. Second branch 34 further includes a second section generally indicated by the numeral 42, which connects the outlet or delivery port 44 of the valve 40 to the delivery port 28 of the air dryer 24. A flow restricting orifice 46 causes a pressure drop in the air communicated to the delivery port 28 through the orifice 46 during regeneration of the desiccant bed of the air dryer 24. A one-way check valve 48 permits flow of regeneration air through the second branch 42 into the delivery port 28 of air dryer 24, but prevents flow in the reverse direction. The electrically actuated valve 40 is a normally closed valve, in which the supply port 38 is closed and the delivery port 44 is vented to atmosphere through exhaust port 50. The delivery port 44 of electrically actuated valve 40 is also connected to the control port 54 of the air dryer 24. The pressure signal communicated to control port 54 opens a purge valve (not shown) of a design well known to those skilled in the art and disclosed in the above-referenced United States Patent to open an exhaust port 56 and thus provide a flow path between the delivery port 28 through the desiccant bed 26 to the exhaust port 56 to permit regeneration or purge air to flow through the desiccant bed 26 and thus regenerate the desiccant. When the signal at control port 54 is vented, which occurs when the valve 40 is deactuated, the exhaust port 56 is closed and the air dryer is capable of its normal drying function.

The system 10 further includes a conventional governor 58 which is connected to the reservoir 20 through line 60. Governor 58 responds to a predetermined pressure level in the air storage reservoir 20 to generate an unloading signal on outlet 62 which is connected to the air compressor 12. Air compressor 12 includes an unloading mechanism which responds to the pressure signal at outlet 62 to hold the valves (not shown) of the compressor 12 open, thus disabling the compressor to prevent further increase of pressure in the air storage reservoir 20 above the preset maximum allowed by governor 58. The compressor 12 may also be disabled through the provision of a clutch on crankshaft 14 which would be connected to the signal at outlet 62 to disconnect the air compressor 12 from the vehicle engine. The pressure signal at outlet 62 is also communicated to a pressure responsive switch 64 which is connected between the vehicle ignition switch 66 and terminal 68 of a timer mechanism 70. Assuming that the vehicle ignition switch 66 is closed to connect the vehicle battery 72 into the circuit, operation of pressure switch 64 by the pressure signal at outlet 62 of governor 58 transmits a signal to terminal 68 of timer 70 to initiate a timing period of the timer. The timer 70 is connected to the solenoid coil indicated diagrammatically at 72 forming a part of the electrically actuated valve 40 to move the valve from its normally closed position to an open position. After a predetermined time period, the timer 70 times out, thereby deenergizing solenoid 72.

In operation, air compressor 12 is operated by the vehicle engine to compress air in the normal manner which is discharged from compressor 12 through outlet delivery port 16 and communicated through the conduit system 18 to air dryer 24, where the moisture entrained in the compressed air is removed from the compressed air by the desiccant bed 26. Compressed air is discharged from air dryer 24 through delivery port 28 and is communicated through one-way check valve 32 into the air storage reservoir 20. When the pressure in air storage reservoir 20 attains a predetermined level, governor 58 responds to generate a pressure signal on outlet 62, which unloads or disables the air compressor 12, thereby preventing further increase in the pressure level in the air storage reservoir 20. The pressure signal generated by governor 58 on outlet 62 is also communicated to pressure switch 64.

Pressure switch 64 controls timer 70 to initiate a timer output period of predetermined length. The timer accordingly actuates coil 72, thereby opening communication between supply port 38 of electrically actuated valve 40 and the delivery port 44 thereof, so that compressed air communicates from air storage reservoir 20 to control port 54 of air dryer 24. The air dryer 24 and its internal purge valve (not shown) responds to the pressure signal at control port 54 to connect deliver port 28 to the exhaust port 56, to provide a flow path between delivery port 28 and exhaust port 56 which extends through the desiccant bed 26. At the same time, pressure from delivery port 44 of electrically actuated valve 40 is communicated through one-way check valve 48 and orifice 46 to the delivery port 28, thereby providing a source of regeneration or purge air which is communicated through the desiccant bed 26 to the exhaust port 56, thereby regenerating the desiccant. Because of the purge orifice 46, it will be noted that the pressure level of the regeneration air communicated to delivery port 28 will be substantially less than the pressure level in the air storage reservoir 20. Accordingly, check valve 32 prevents communication from the storage tank 20 back to the delivery port 28 during such regeneration of the dessicant bed.

After the predetermined time period of timer 70 has expired, the coil 72 is deenergized, thereby closing off supply port 38 and venting delivery port 44 to the exhaust port 50. Accordingly, the pressure signal at control port 54 is removed, thereby enabling the air dryer 24 to again perform its normal drying function. Flow of compressed air from delivery port 28 to the exhaust port 50 through the section 42 is prevented by one-way check valve 48.

After the period of timer 70 has expired, the compressor 12 remains disabled or unloaded as long as the pressure level in air storage reservoir 20 remains above the cutout point of the governor 58. However, when the pressure level in air storage reservoir 20 drops below the cutout point of governor 58, the pressure signal on outlet 62 is removed, thereby again enabling or loading the compressor 12 to again supply compressed air to the air storage reservoir 20. It will be noted that if the compressor is again enabled or loaded before the timer 70 times out that the purge cycle will be automatically discontinued, because the pressure switch 64 will be opened by termination of the control signal at outlet 62 of governor 58.

What is claimed is:

1. Compressed air system comprising an air compressor, an air storage reservoir for storing compressed air, an air dryer having a supply port communicated with said air compressor for receiving compressed air from said air compressor, a delivery port for delivering compressed air to said air storage reservoir, a desiccant bed between said supply and delivery ports for drying compressed air communicated from said air compressor to said air storage reservoir through said air dryer, an exhaust port, and control means for causing flow of regeneration air from said delivery port through said desiccant bed to said exhaust port for regenerating said desiccant and for permitting flow of compressed air from said delivery port to said reservoir but preventing flow of compressed air in the reverse direction, a first conduit branch connected between said delivery port and said air storage reservoir for delivering compressed air from the air dryer to said air storage reservoir, a second conduit branch connected to said first conduit branch between said air storage reservoir and said delivery port for communicating regeneration air from said air storage reservoir to said delivery port, said control means including means normally closing said second conduit branch but opening the latter to permit communication of regeneration air from said air storage reservoir to said delivery port for communication through said desiccant bed to said exhaust port during regeneration of said desiccant bed.

2. Compressed air system as claimed in claim 1, wherein said control means includes timer means for limiting communication through said second conduit branch to a predetermined time period.

3. Compressed air system as claimed in claim 1, wherein said system includes disabling means responsive to the pressure level in the air storage reservoir for disabling said air compressor when the pressure level in the air storage reservoir attains a predetermined level, said control means being responsive to disabling of said air compressor by said disabling means to initiate communication through said second branch to cause regeneration of said desiccant bed.

4. Compressed air system as claimed in claim 3, wherein said second branch includes an orifice causing said regeneration air communicated to said delivery port through said second branch to be at a pressure level less than the pressure level in said air storage reservoir.

5. Compressed air system as claimed in claim 4, wherein said control means includes a check valve apparatus in said second branch permitting communication from said air storage reservoir to said delivery port through said second branch but preventing communication in the reverse direction.

6. Compressed, air system as claimed in claim 3, wherein said control means includes a check valve device in said first branch permitting communication from said delivery port to said air storage reservoir but preventing communication in the reverse direction, said second branch being connected around said check valve device so that said regeneration air bypasses said first check valve.

7. Compressed air system as claimed in claim 6, wherein said control means includes a check valve apparatus in said second branch permitting communication from said air storage reservoir to said delivery port through said second branch but preventing communication in the reverse direction.

8. Compressed air system as claimed in claim 3, wherein said control means includes an electrically actuated control valve in said second branch responsive to disabling of said air compressor to switch from a normally closed position blocking communication through said second branch to an open position permitting communication through said second branch, and timer means initiated upon switching of said control valve to said open position to return said control valve to said normally closed position a predetermined time period after said control valve is switched from said closed position to said open position.

9. Compressed air system as claimed in claim 8, wherein said disabling means generates a pressure signal when the pressure level in the air storage reservoir attains said predetermined level, said control means including a pressure responsive switch responsive to said pressure signal for switching said electrical actuated control valve from said normally closed position to said open position in response to said pressure signal.

10. Compressed air system as claimed in claim 8, wherein said control means includes a check valve apparatus in said second branch permitting communication from said air storage reservoir to said delivery port through said second branch but preventing communication in the reverse direction, said electrically actuated control valve being located between said check valve apparatus and said air storage reservoir.

11. Compressed air system as claimed in claim 10, wherein said second branch includes an orifice causing said regeneration air communicated to said delivery port through said second branch to be at a pressure level less than the pressure level in said air storage reservoir.

12. Compressed air system as claimed in claim 10, wherein said control means includes a control port on said air dryer, said air dryer being responsive to a pressure signal at said control port for opening said exhaust port and causing regeneration of said desiccant bed, said electrically actuated control valve communicating said pressure signal to said control port when said electrically actuated control valve is switched from said normally closed position to said open position.

13. Compressed air system as claimed in claim 12, wherein said electrically actuated control valve includes an exhaust port, said electrically actuated control valve venting said pressure signal to said exhaust port when the electrically actuated control valve is in the normally closed position.

14. Compressed air system as claimed in claim 12, wherein said electrically actuated control valve includes an exhaust port, an inlet port communicated to said air storage reservoir, and an outlet port communicated to both said control port and said check valve apparatus.

15. Compressed air system as claimed in claim 12, wherein said second branch includes an orifice causing said regeneration air communicated to said delivery port through said second branch to be at a pressure level less than the pressure level in said air storage reservoir, said electrically actuated control valve including an exhaust port, an inlet port communicated to said air storage reservoir, and an outlet port communicated to both said control port and said orifice.

* * * * *